United States Patent [19]
Springer et al.

[11] Patent Number: 5,311,628
[45] Date of Patent: May 17, 1994

[54] DOCK LEVELER WITH AN IMPROVED AUTOMATIC MATERIAL HANDLING VEHICLE BARRIER

[75] Inventors: Scott L. Springer, Milwaukee; Norbert Hahn, Franklin, both of Wis.

[73] Assignee: Rite-Hite Corporation, Milwaukee, Wis.

[21] Appl. No.: 894,087

[22] Filed: Jun. 5, 1992

[51] Int. Cl.⁵ .................................................. E01D 1/00
[52] U.S. Cl. .......................................... 14/71.1; 14/71.3
[58] Field of Search ................. 14/69.5, 71.1, 71.3, 14/71.7; 296/61; 410/6

[56] References Cited

U.S. PATENT DOCUMENTS

| | | | |
|---|---|---|---|
| 3,806,976 | 4/1974 | Yoon | 14/69.5 X |
| 4,920,598 | 5/1990 | Hahn | 14/71.3 X |
| 5,040,258 | 8/1991 | Hahn et al. | 14/71.3 |
| 5,157,801 | 10/1992 | Alexander | 14/71.3 |

Primary Examiner—Ramon S. Britts
Assistant Examiner—James A. Lisehora
Attorney, Agent, or Firm—Leydig, Voit & Mayer, Ltd.

[57] ABSTRACT

A dock leveler assembly for a loading dock is provided having an adjustable ramp, a pivotally mounted lip and a pivotally mounted barrier plate both disposed at front edge portion of the ramp. The pivotal movement of the lip and the barrier plate are coordinated so that, when the lip is in a depending stored position, the barrier plate may be selectively adjusted to assume either an operative upwardly projecting vehicle barrier mode or an inoperative non-projecting mode allowing material handling equipment to load or unload the rear end of a vehicle parked adjacent the loading dock. When the lip is in an operative cantilevered position bridging a gap formed between the ramp front edge portion and the bed of a parked vehicle the barrier plate assumes the inoperative mode allowing material handling equipment to pass over the ramp and the lip onto the bed of the parked vehicle during loading and unloading thereof.

7 Claims, 4 Drawing Sheets

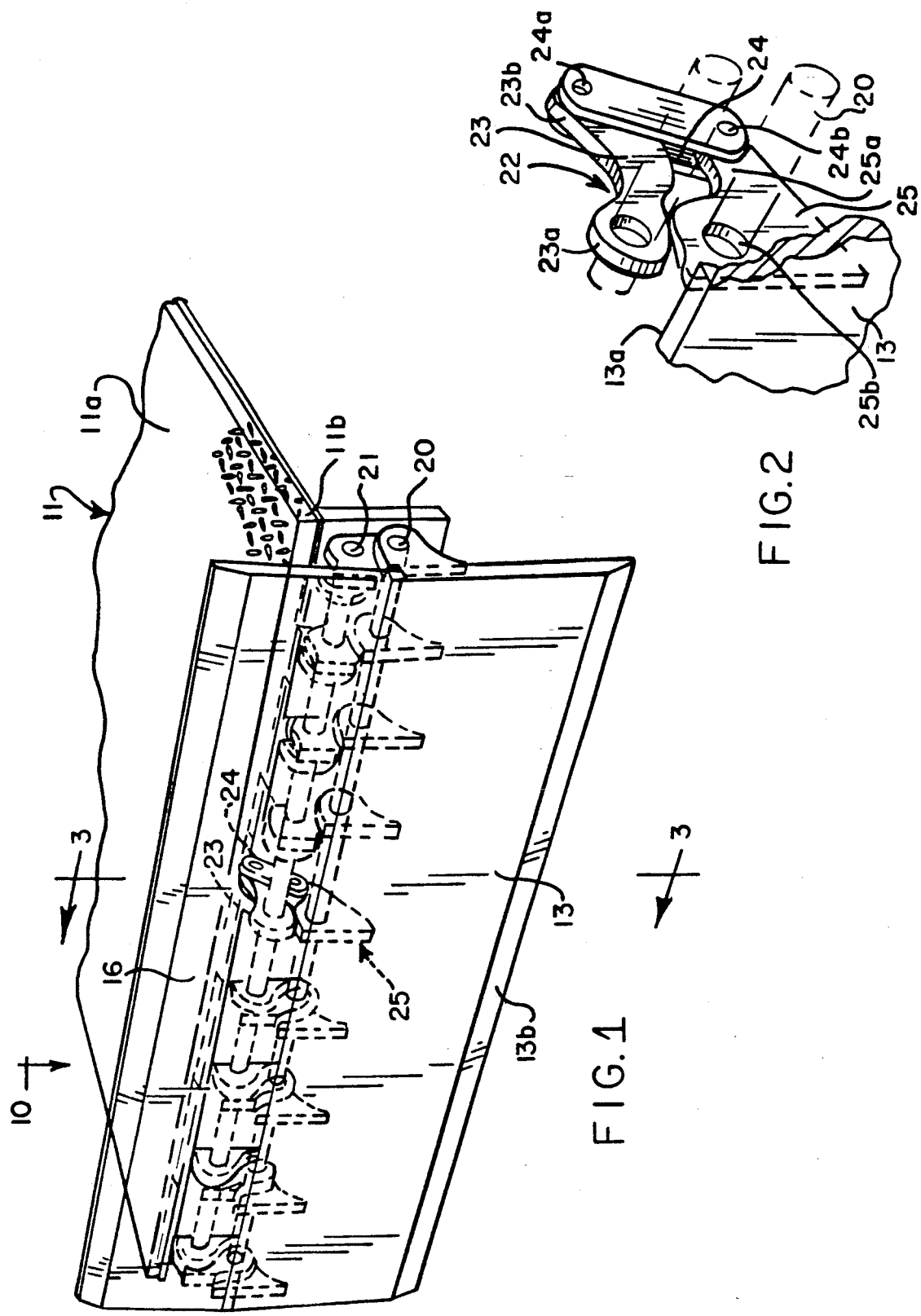

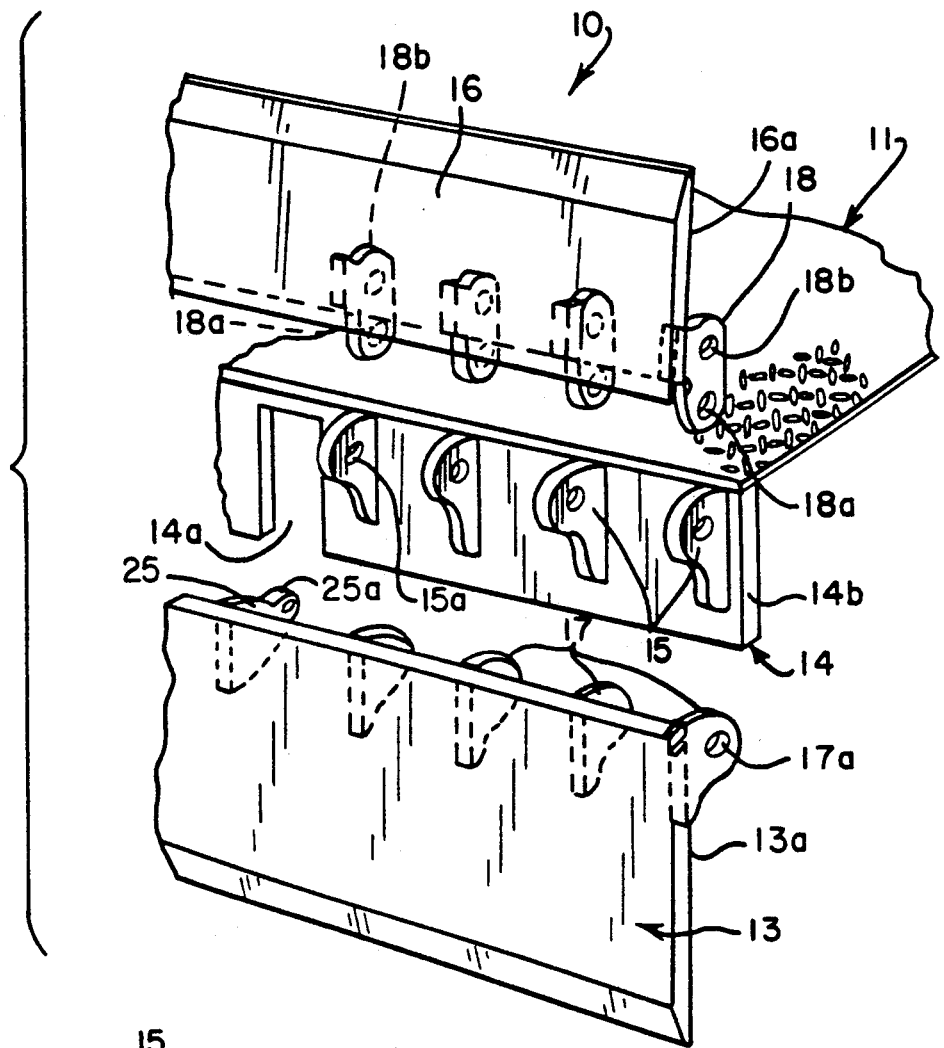
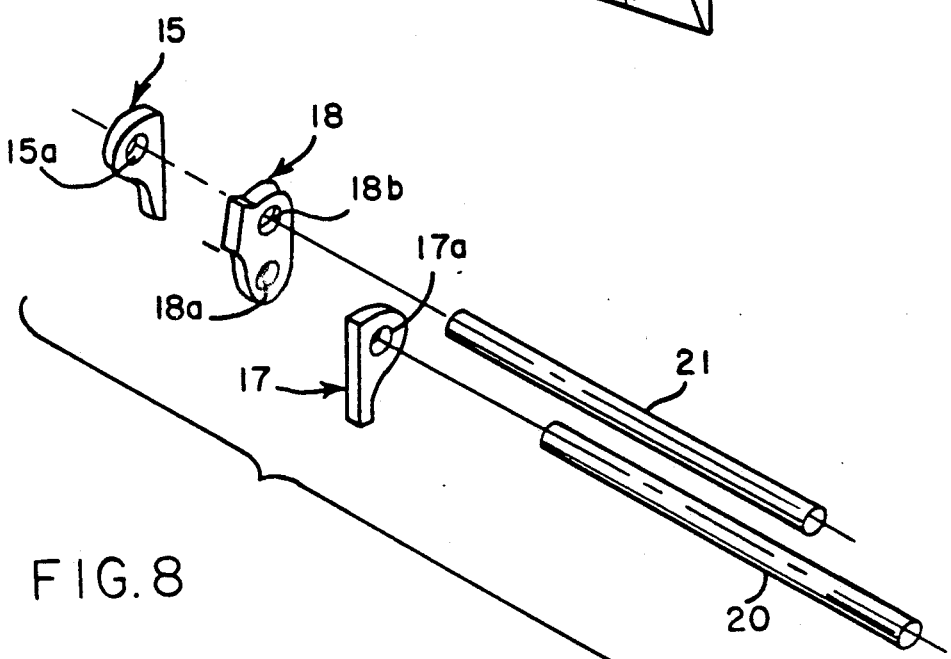

DOCK LEVELER WITH AN IMPROVED AUTOMATIC MATERIAL HANDLING VEHICLE BARRIER

FIELD OF THE INVENTION

The invention relates to a loading dock leveler assembly provided with an adjustable safety barrier for preventing accidental movement of material handling equipment off the loading dock platform when the leveler assembly is in a stored position.

BACKGROUND OF THE INVENTION

Loading dock leveler assemblies normally embody a hingedly mounted loading ramp or deck which is adjustable between a stored position wherein an exposed surface thereof is substantially coplanar with the dock platform surface and an operative position allowing loading or unloading of the bed of a truck parked adjacent the front wall of the dock. An extension plate or lip is pivotally mounted on the front edge of the ramp and, when in an extended or cantilevered mode, bridges the gap which occurs between the rear end of the truck bed and the front wall of the loading dock.

It has been found, however, that certain safety problems may occur when such dock levelers are used. For example, dock personnel may inadvertently drive or push material handling equipment (e.g., a fork lift truck) off the front edge of the loading dock leveler when there is no vehicle parked adjacent the loading dock and the ramp is in the stored position.

To minimize the risk of such "accidental run offs" dock levelers have heretofore been developed that include various forms of barriers which physically obstruct and thereby prevent movement of material handling vehicles beyond the front edge of the dock leveler. For example, in certain dock levelers the pivot axis of the lip is set back a substantial distance from the rear edge of the lip so that the rear section of the lip between the pivotal axis and the lip rear edge projects above the ramp surface and forms a barrier when the lip is in a depending position with respect to the ramp. In such levelers, however, unless the ramp surface and the exposed surface of the lip are coplanar, when the lip is in an extended cantilevered position, the rear section of the lip still projects angularly upwardly to a varying degree above the loading ramp surface forming a vehicle barrier. This continued projection of the lip rear section may seriously obstruct the loading and unloading operations.

Recognizing this problem, several dock leveler assemblies have heretofore been developed with an automatic barrier which is either coplanar with or slightly below the exposed ramp surface when the lip is in an operative extended cantilevered position or in other positions. Examples of such dock leveler assemblies are disclosed in U.S. Pat. Nos. 4,920,598 and 5,040,258, wherein the ramp is pivotally mounted for movement between three positions—a stored first position in which the exposed ramp surface is substantially coplanar with the loading dock platform surface, an upwardly inclined second position, and a declining third position. The front edge portion of the ramp includes a pivotally mounted lip moveable between a stored vertical position and an operative outwardly extending cantilevered position. This lip integrally includes a barrier unit, a portion of which automatically projects above the ramp exposed surface to form a vehicle barrier of optimum height when the extension plate or lip is in the stored vertical position, and which, when the lip is in the outwardly extending cantilevered operative position, automatically retracts below the exposed ramp surface.

While in most circumstances it is desirable to employ an automatic material handling vehicle barrier when the dock leveler assembly is in a stored position, there are certain other circumstances when it may not be desirable to do so because the barrier may interfere with the end loading or unloading of a parked truck by a material handling vehicle. In such circumstances the material must be loaded onto or unloaded from the rear portion of the truck bed and the placement of the material would interfere with the lip if it was in a fully extended position.

SUMMARY OF THE INVENTION

Thus, an improved loading dock leveler has been provided having both a pivoting lip and a pivoting safety barrier member mounted on the front edge of the ramp. The pivotal movement of the lip and the barrier member are coordinated so that when the lip is in a stored position, the barrier member may assume either an automatic operative vehicle blocking position or a selected inoperative non-blocking position allowing material handling vehicles to load or unload the rear end of a parked truck. When the lip is in an operative cantilevered position the barrier member is automatically in an inoperative position allowing material handling vehicles to pass over the ramp and the lip onto the truck bed for loading or unloading thereof.

The improved loading dock leveler is readily operable, highly reliable, easy to maintain and repair and positioning of the barrier member may be independent of the positioning of the lip.

In the preferred embodiment, the barrier member is automatically raised when the lip is placed in the stored position, although the barrier member subsequently can be lowered, e.g., for end-loading purposes, while the lip is stored. Similarly, the barrier member is automatically lowered when the lip is extended to the cantilevered position. Preferably, the barrier member is inoperative when the lip is cantilevered, to avoid accidental obstruction of loading equipment.

The improved loading dock leveler readily allows loading and unloading of the rear end of a truck bed without obstruction by the safety barrier member.

Further and additional advantages will appear from the following description, accompanying drawings, and appended claims.

In accordance with one embodiment of the invention a dock leveler is provided having a ramp mounted on a supporting frame for pivotal movement between a first stored position, wherein an exposed ramp surface is substantially coplanar with the loading dock platform surface, and a second operative position wherein the exposed ramp surface and extended lip coact to allow loading and unloading of the parked truck. Hingedly attached to the front edge portion of the ramp (i.e. the edge of the ramp adjacent the parked truck) is a barrier member which is movable between a substantially vertical position wherein the member projects above the exposed ramp surface to form a vehicle barrier and a substantially horizontal position wherein the barrier member assumes a non-projecting position relative to the exposed ramp surface.

The aforementioned lip is hingedly attached to the barrier member for pivotal movement between a depending, substantially vertical, stored position and an extended cantilevered, operative position bridging a gap which exists between the ramp front edge and the bed of the parked truck. The pivotal movement of the barrier member about the front edge of the ramp and the pivotal movement of the lip about its axis are coordinated so that when the lip is in its depending, stored position, the barrier member may either be automatically in the substantially vertical, projecting position forming a vehicle barrier or selectively in the substantially, horizontal, non-projecting position. When the lip is in its extended cantilevered, operative position, the barrier member automatically assumes a substantially horizontal, non-projecting position.

DESCRIPTION OF THE DRAWINGS

For a more complete understanding of the present invention reference should be made to the accompanying drawings wherein FIG. 1 is a fragmentary perspective view of one embodiment of the improved dock leveler assembly showing the barrier member thereof in an operative vehicle barrier position and the lip in a depending, substantially vertical, stored position.

FIG. 2 is an enlarged fragmentary perspective view of the lever mechanism in partially disassembled relation, shown in FIG. 3 for imparting adjustment of the lip and barrier member independently of the ramp.

FIG. 7 is similar to FIG. 1 but showing components thereof in exploded relation.

FIG. 8 is a fragmentary perspective front view of selected hinge components for interconnecting the barrier member, lip and ramp.

The assembly 10 includes a ramp 11, sometimes referred to as a deck, having a rectangular or square configuration. The ramp 11 is disposed in registry with a pit or recess, not shown, normally formed in the platform surface of a conventional or industrial loading dock such as provided at a commercial or industrial facility. The pit has an open top side and a front side which opens at the front wall of the loading dock. The peripheral configuration of the ramp corresponds substantially to the shape of the pit top side. A rear peripheral segment of the ramp, not shown, may be hingedly connected to a section of a frame 12, see FIG. 3; the latter being fixedly mounted within the pit. The connection between the ramp and frame section and the mechanism for hingedly adjusting the ramp relative to the frame section are well known in the dock leveler art, see U.S. Pat. Nos. 4,110,860 and 4,995,130 and thus, form no part of the invention hereinafter described.

Figure 3:
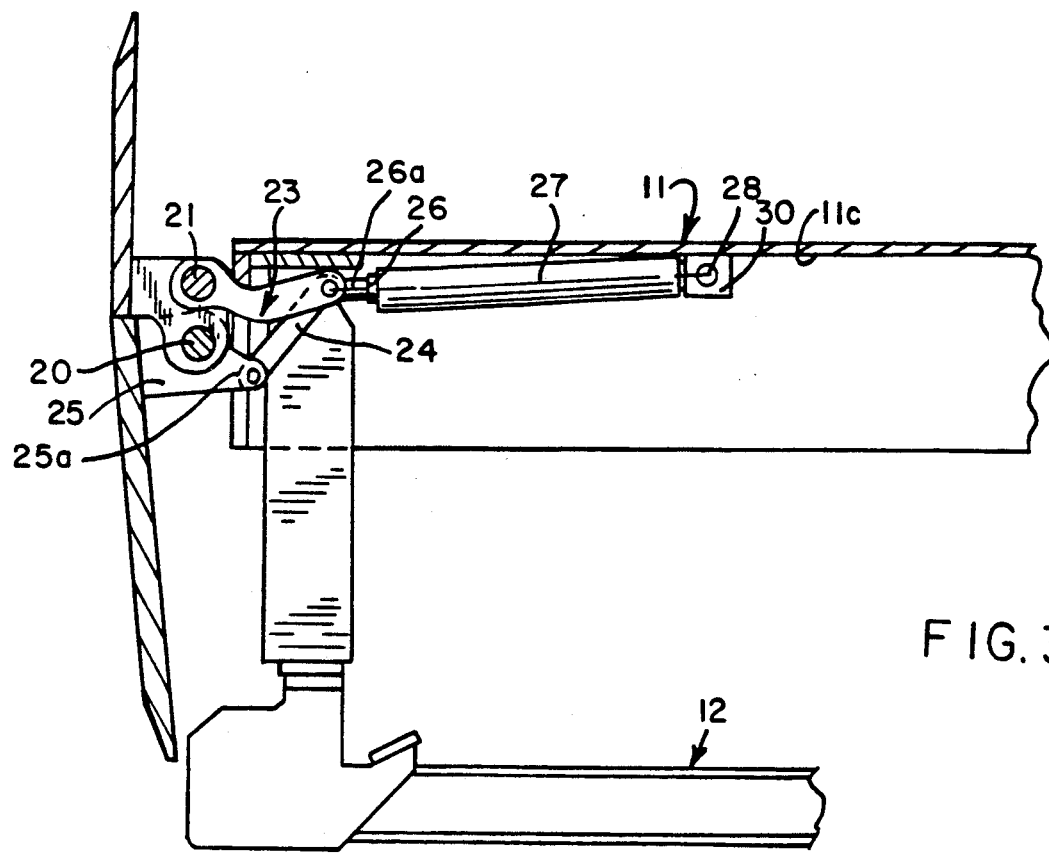
FIG. 3 is a sectional view taken along line 3—3 in FIG. 1.

When the leveler 10 is in an inoperative or stored mode I, as seen in FIGS. 1 and 3, the exposed top surface 11a of the ramp is horizontal and substantially coplanar with the portions of the platform surface circumjacent the pit open top side. The ramp 11 is supported in mode 1 by a pair of legs 31 resting on frame (12) stop brackets 32 as will be described more fully hereinafter. When ramp 11 is supported in mode I, the ramp will not obstruct cross traffic of material handling equipment (e.g. fork-lift trucks) on the dock platform.

Fixedly mounted on and protruding from the front face of flange 14 and arranged in laterally spaced, aligned relation are a plurality of first brackets 15, see FIG. 7.

In addition to lip 13, a barrier member 16 is hingedly connected to the front peripheral segment 11b of ramp 11 as seen more clearly in FIGS. 3-5 and 7. The barrier member 16, as illustrated may be in the form of a plate. Both lip 13 and plate 16 may extend the full width of ramp 11. Lip 13 has a plurality of laterally spaced second brackets 17 projecting from the back surface 13a thereof. Each bracket 15 and 17 is provided with a transversely extending hole 15a and 17a. Barrier member 16 is also provided with a plurality of laterally spaced third brackets 18 which project from the back surface 16a thereof. Each bracket 18 is provided with a pair of spaced holes 18a, 18b. Brackets 15, 17 and 18 may be of plate or tubular construction.

When lip 13 and barrier member 16 are assembled on the front peripheral segment 11b of the ramp, brackets 17 are positioned adjacent corresponding sides of brackets 18 so that the bracket holes 17a and 18a are in axial alignment and accommodate an elongate first pintle 20, see FIG. 8. In a similar manner brackets 15 are positioned adjacent the opposite corresponding sides of brackets 18 so that the bracket holes 15a and 18b are in axial alignment and accommodate an elongate second pintle 21, see FIG. 8.

As seen in FIG. 7, flange 14 is provided with a cutout 14a which is laterally offset a substantial distance from the exposed end 14b of the flange. Aligned with the cutout 14a is a lever mechanism 22, see FIG. 2, which includes an elongate first lever arm 23 having an apertured end portion 23a which accommodates a portion of pintle 21. The opposite end portion 23b of arm 23 is apertured and positioned between a pair of second lever arms 24. End portions 24a of arms 24 are pivotally connected to end portion 23b of arm 23 and end portions 24b are pivotally connected to a finger-like portion 25a formed on a bracket 25 affixed to the back surface 13a of the lip 13, see FIG. 2. Bracket 25 may be provided with a hole 25b which is sized to accommodate a portion of pintle 20, see FIG. 5.

Figure 4:
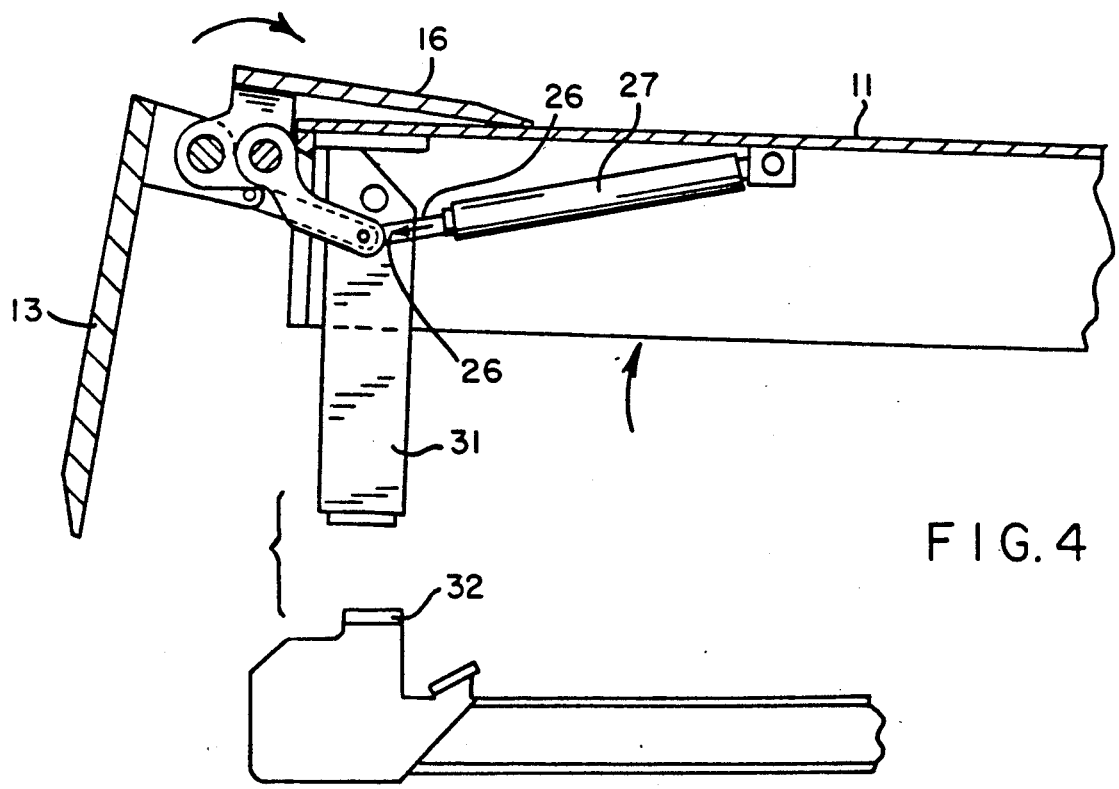
FIG. 4 is similar to FIG. 3, but showing the lip in a depending, substantially vertical, stored position and the barrier member in a, non-projecting, inoperative position.
Figure 5:
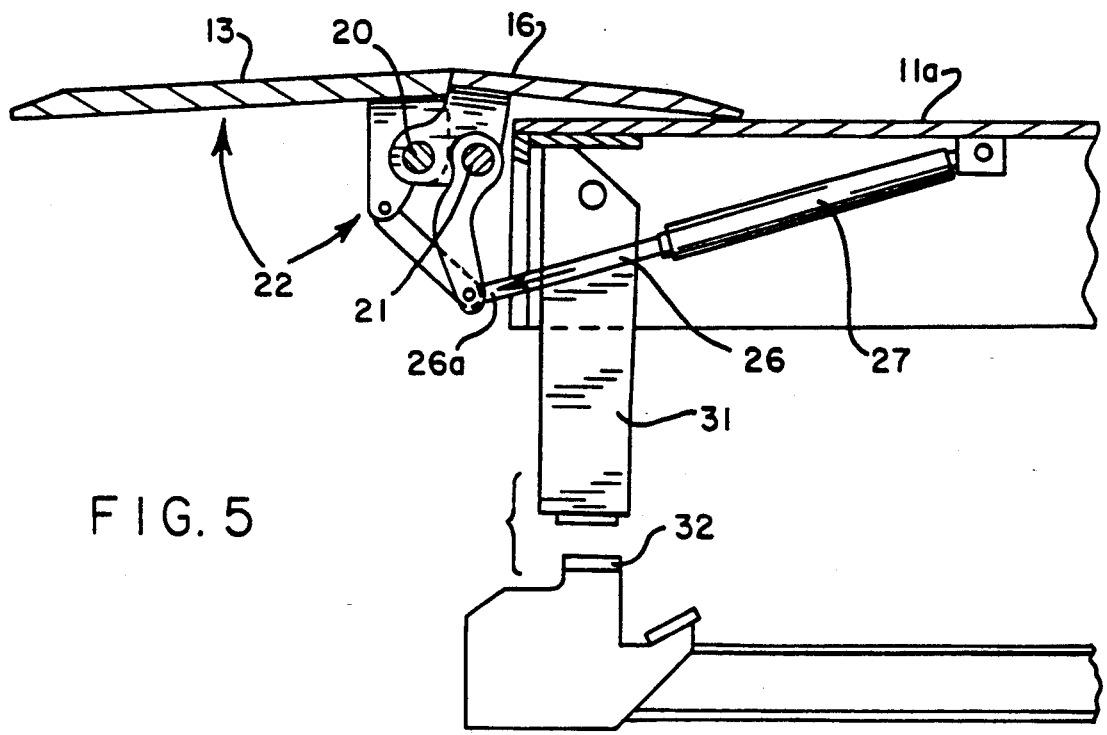
FIG. 5 is similar to FIG. 4, but showing the lip in an extended cantilevered operative position and the barrier member in a, non-projecting inoperative position.

Also pivotally connected to the end portion 23b and 24a of lever arms 23 and 24, respectively, is one end 26a of piston rod 26, see FIGS. 3-5. The opposite end of the piston is concealed within an hydraulic cylinder 27. Cylinder 27 is pivotally connected at 28 to a bracket 30 which depends from the underside 11c of ramp 11. Because of the configuration of lever mechanism 22 and the connections thereof to bracket 25 and the elongate pintle 21, movement of the piston rod 26 relative to the cylinder 27 selectively permits unitary movement of lip 13 and barrier member 16 as well as independent movement of member 16 as will be described more fully hereinafter.

It will be understood that the lip and the barrier member may be actuated by means other a piston and hydraulic cylinder, for example, by mechanical, pneumatic, or electromechanical devices, a screw drive, or cables assisted by springs.

As seen in FIGS. 1 and 3, the barrier member 16 is disposed in a vehicle blocking mode, that is to say it is projecting upwardly at substantially a right angle to the exposed ramp surface. At the same time, the lip 13 assumes a vertical depending position, or stored mode, wherein the platform (11) is supported by legs 31. In order for the barrier member 16 and the lip 13 to assume the relative positions shown in FIGS. 1 and 3, the piston 26 is retracted to the fullest extent into the cylinder 27. Movement of the piston between an extended position, FIG. 5, and a fully retracted position, FIG. 3, is manually controlled from a control panel, not shown, normally mounted in a remote, yet secure location.

As the piston 26 moves from the fully extended position, FIG. 5, towards the fully retracted position, FIG. 3, the lip member 13 through lever arms 23 and 24, pintle 20, and bracket 18 (aligned with cutout 14a) is caused to pivot in a counter-clockwise direction, as viewed in FIG. 4, about the longitudinal axis of pintle 20 until the piston has moved approximately one half the distance towards the fully retracted position. Continued movement of the piston to the fully retracted position causes the barrier 16 to assume the operative position and the lip 13 to assume a depending stored position as shown in FIG. 3.

When the barrier member 16 and lip 13 are in the relative positions shown in FIG. 4, which occur when the piston 26 assumes a position substantially midway between the fully extended position, FIG. 5, and the fully retracted position, FIG. 3, end loading of a parked truck at or above the loading dock platform surface can be readily accomplished. Also, when the barrier member 16 and lip 13 are in a relative position shown in FIG. 4, the ramp 11 can be pivoted below the platform surface of the dock so as to service the bed of a parked truck which is located below the dock platform surface. When the ramp 11 is to be pivoted below the dock platform surface, support legs 31, which are pivotally connected to the underside of the ramp, are pivoted in a counter-clockwise direction so as not to engage stationary stops 32 affixed to the dock leveler frame 12. The legs and stops are of conventional design and, when in the normal operative mode support platform 11 in the stored position and prevent accidental and sudden downward movement of the ramp below the dock platform surface which, unless checked, might cause a material handling vehicle and/or the product being handled thereby to fall off the dock.

If the lip 13 is in the outwardly projecting position and the barrier member 16 is in substantially coplanar relation with the lip, as shown in FIG. 5, the lip 13 spans a gap, not shown, which exists between the rear end of the truck bed and the dock front wall. With the lip and barrier member are in such relative positions, the parked truck may be readily loaded and unloaded utilizing a fork-lift truck or other material handling equipment. Where the bed of a parked truck is below the dock platform surface, the depending safety foot 31 is pivoted counter-clockwise so as to be out of alignment with stop 32 thereby enabling the ramp with the outwardly extending lip to be pivoted downwardly as a unit so as to assume a declining position.

In order for the lip 13 to be moved to an outwardly extending cantilevered position it is necessary that the ramp be initially pivoted upwardly a sufficient amount so that the free edge 13b of the lip clears the rear end of the bed of the parked truck. Once the lip assumes its cantilevered position, the ramp and extended lip are lowered as a unit until the lip comes to rest upon the exposed surface of the truck bed.

Figure 6:
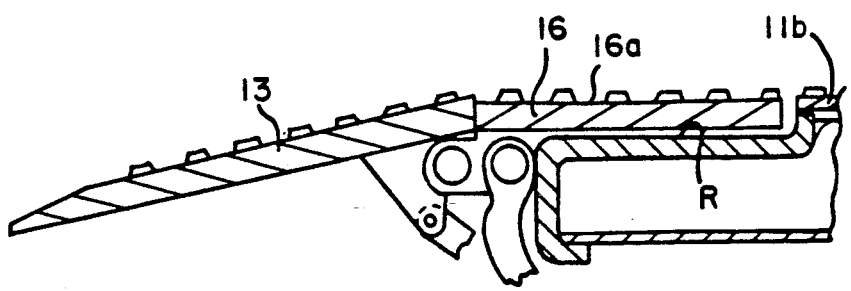
FIG. 6 is an enlarged fragmentary sectional view similar to FIG. 5 but of a modified construction.

It will be noted in FIGS. 4 and 5 that the barrier member 16 overlies the exposed surface of the ramp. If such a relationship is deemed undesirable, the outer edge portion 11b of the ramp 11 may be provided with a recess R, see FIG. 6. The depth of the recess is approximately the thickness of the barrier member 16. Thus, when barrier member 16 is in its inoperative mode (i.e. overlying the free edge portion of the ramp) the exposed surface 16a of the barrier member 16 is substantially flush with the exposed ramp surface.

Thus, an improved loading dock leveler has been disclosed which is of simple, yet sturdy construction and has both a pivoting lip and a pivoting barrier member at the front edge of the ramp whereby the pivotal movement of the lip and barrier member are coordinated so that the barrier member can selectively assume either an operative barrier-forming upright position or an inoperative non-projecting position allowing material handling vehicles to load and unload a parked truck.

I claim:

1. A dock leveler assembly for a loading dock comprising:
  (a) a pivotally mounted ramp adjustable between a first position wherein an exposed surface of said ramp is substantially coplanar with a platform surface of the dock and a second position for loading and unloading the bed of a vehicle parked at the dock;
  (b) a barrier member pivotally connected about an axis to a front edge portion of said ramp for selected solely pivotal movement about the axis between an operative position wherein a substantial portion of said barrier member angularly protrudes above the ramp exposed surface, and an inoperative position, wherein no substantial portion of said barrier member angularly protrudes above the ramp exposed surface;
  (c) a lip extension connected to said barrier member for pivotal movement between a first position wherein said lip extension depends from the ramp front edge portion and a second position wherein said lip extension is cantilevered from said ramp front edge bridging a gap formed between said ramp front edge portion and the bed of the parked vehicle, the lip extension being operatively connected to the barrier member such that when said lip extension is in the first position, said barrier member may selectively assume either the operative or inoperative position, and when the lip extension is in the second position, said barrier member assumes said inoperative mode; and
  (d) at least one actuator for initiating and coordinating the pivotal movement of said barrier member and said lip extension.

2. A dock leveler assembly of claim 1 wherein a retaining means is provided for retaining said ramp in said first position.

3. A dock leveler assembly for a loading dock comprising
  (a) a support frame mountable within a pit formed in the platform surface of the dock;
  (b) a ramp pivotally connected to said support frame and adjustable between a stored position wherein an exposed surface of said ramp is substantially coplanar with the dock platform surface circumjacent the pit, and a non-stored position;

(c) a header section affixed to and depending from a front edge portion of said ramp;

(d) a barrier member pivotally connected about an axis to said header section for selected solely pivotal movement about the axis between an operative position wherein at least a substantial portion of said barrier member and an inoperative position wherein said barrier member does not angularly protrude substantially above the ramp exposed surface;

(e) a lip extension connected to said barrier member for pivotal movement between a first position wherein said lip extension depends from the ramp exposed surface and a second position wherein said lip extension assumes a cantilevered position from said ramp front edge portion bridging a gap formed between said ramp front edge portion and the bed of a parked vehicle, the lip extension being operatively connected to the barrier member such that when said lip extension is in the first position, said barrier member may selectively assume either the operative or inoperative position, and when the lip extension is in the second position, said barrier member assumes said inoperative position; and (f) at least one actuator for initiating and coordinating the pivotal movement of said barrier member and said lip extension.

4. The dock leveler assembly of claims 1 or 3 wherein the actuator includes a piston/cylinder unit wherein a cylinder thereof is pivotally connected to an underside of said ramp, and a piston thereof has an exposed end portion pivotally connected to a lever assembly; said lever assembly including a first lever link pivotally connected at one end to a first portion of a first bracket affixed to a backside of said barrier member and to a second bracket affixed to the ramp front edge portion, a second lever link pivotally connected at one end to a second end of said first lever link and pivotally connected at a second end to a first portion of a third bracket affixed to a backside of said lip extension; the piston exposed end being pivotally connected to the first lever link second end; said third bracket having a second portion thereof pivotally connected to a second portion of said first bracket.

5. The dock leveler assembly of claims 1 or 3 wherein both the barrier member and the lip extension have a dimension corresponding substantially to a width dimension of said ramp.

6. The dock leveler assembly of claim 5 wherein the barrier member and lip extension are formed of plate material.

7. The dock leveler assembly of claim 6 wherein the ramp front edge portion is provided with a recess having a depth substantially the same as the thickness of said barrier member plate material whereby, when said barrier member is in the inoperative position, an exposed surface of said barrier member is substantially coplanar with the exposed surface of the ramp.

* * * * *